(No Model.)
G. W. MORRIS & W. FRECH.
COMBINED SPRING MEASURER AND TRACK INDICATOR.
No. 315,532. Patented Apr. 14, 1885.
5 Sheets—Sheet 1.
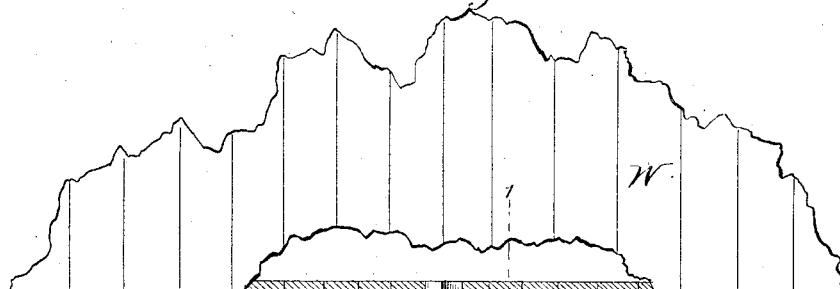
Fig. 1.
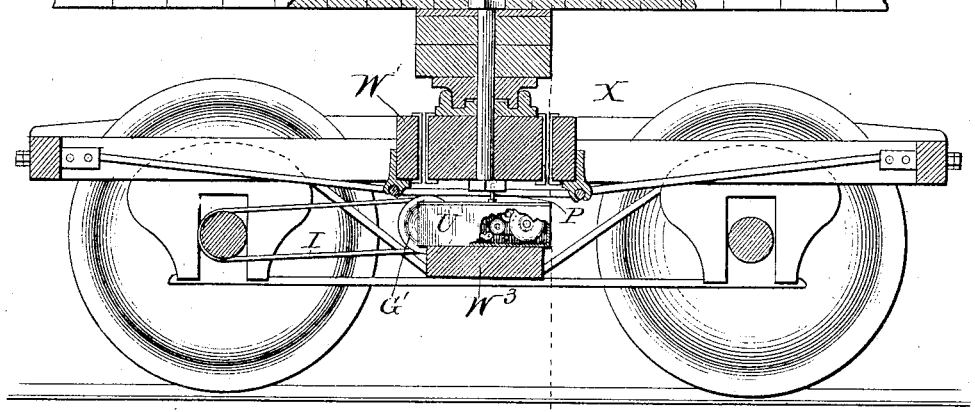
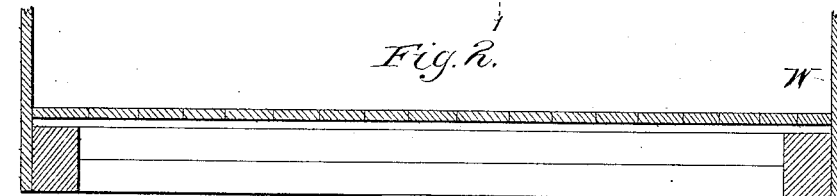
Fig. 2.
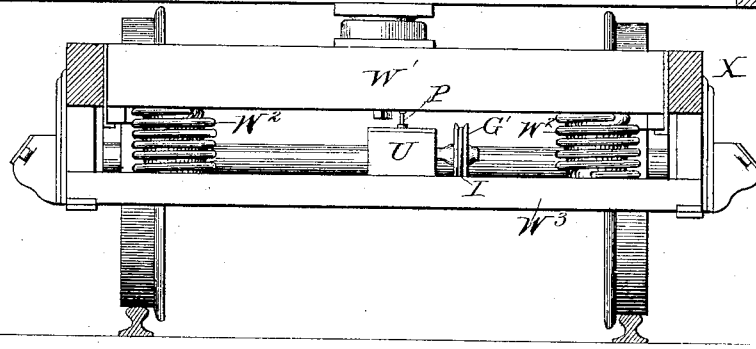
Witnesses.
Inventors.
George W. Morris and
William Frech
By Jno. G. Elliott
Atty.

(No Model.)
G. W. MORRIS & W. FRECH.
COMBINED SPRING MEASURER AND TRACK INDICATOR.
No. 315,532. Patented Apr. 14, 1885.
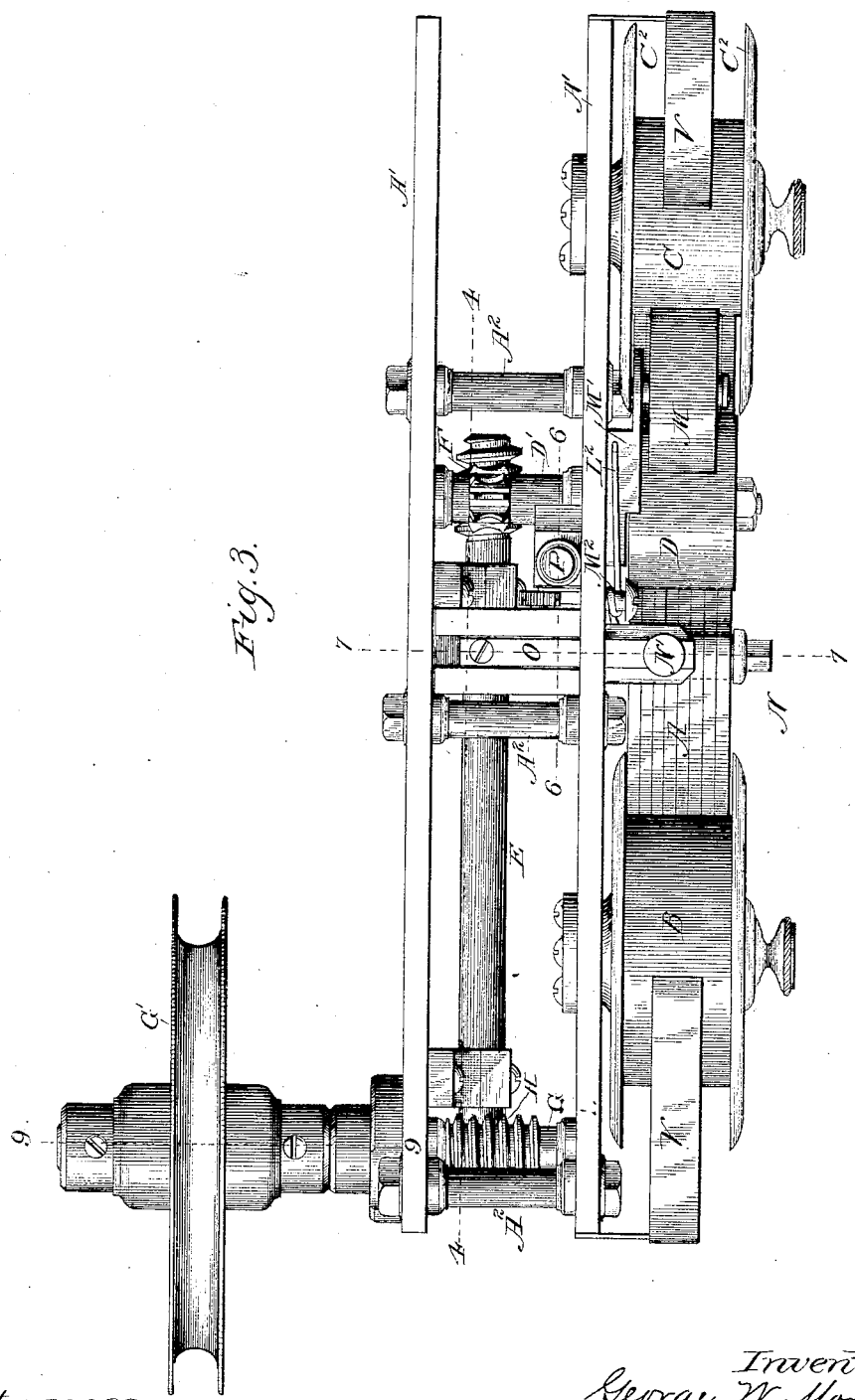

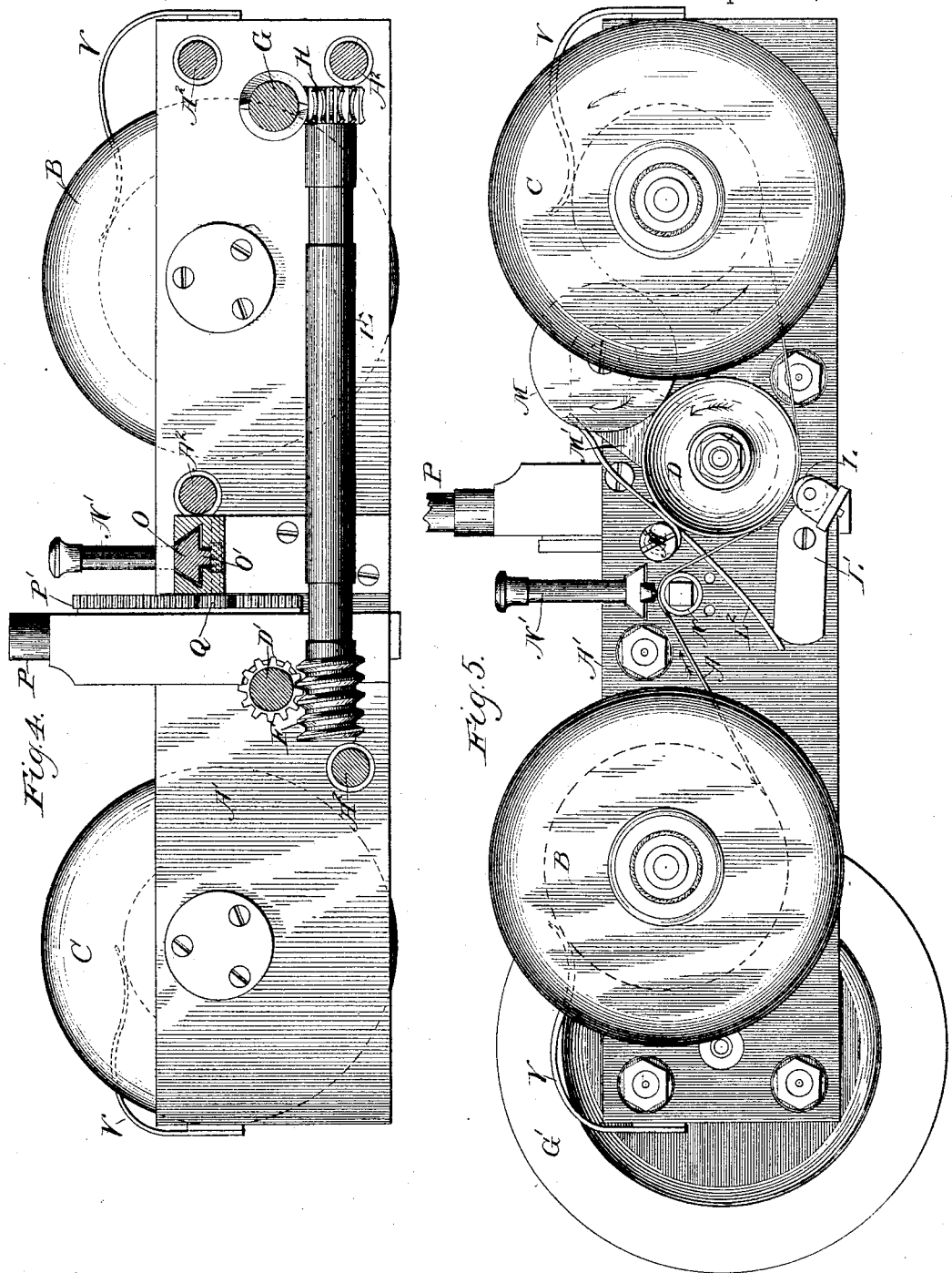

(No Model.) 5 Sheets—Sheet 4.
G. W. MORRIS & W. FRECH.
COMBINED SPRING MEASURER AND TRACK INDICATOR.
No. 315,532. Patented Apr. 14, 1885.
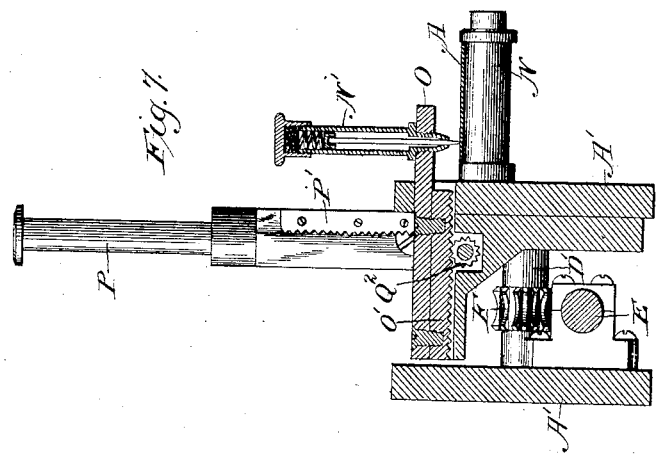
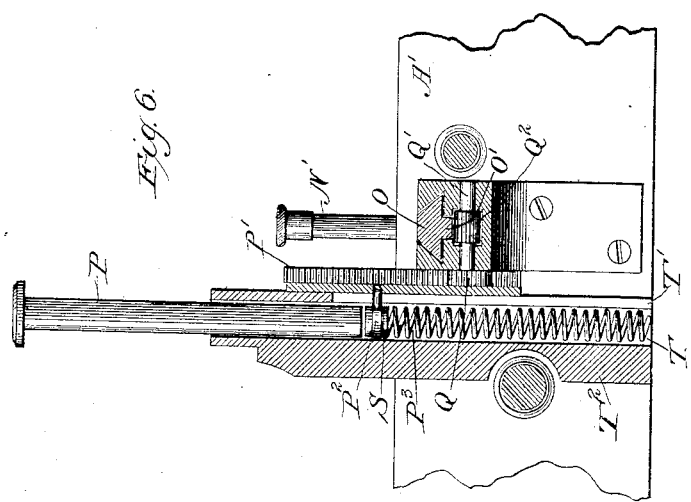

(No Model.) G. W. MORRIS & W. FRECH. 5 Sheets—Sheet 5.
COMBINED SPRING MEASURER AND TRACK INDICATOR.
No. 315,532. Patented Apr. 14, 1885.
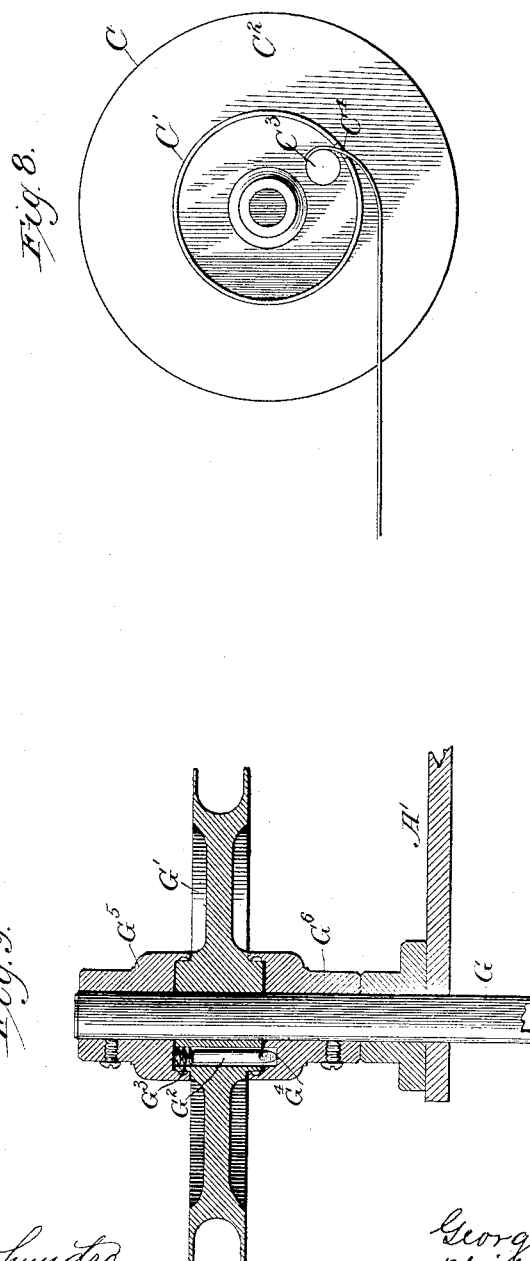

UNITED STATES PATENT OFFICE.

GEORGE W. MORRIS, OF PITTSBURG, PENNSYLVANIA, AND WILLIAM FRECH, OF CHICAGO, ILLINOIS.

COMBINED SPRING-MEASURER AND TRACK-INDICATOR.

SPECIFICATION forming part of Letters Patent No. 315,532, dated April 14, 1885.

Application filed April 19, 1884. (No model.)

*To all whom it may concern:*

Be it known that we, GEORGE W. MORRIS and WILLIAM FRECH, both citizens of the United States, respectively residing in Pittsburg, county of Allegheny, and State of Pennsylvania, and Chicago, county of Cook, and State of Illinois, have invented certain new and useful Improvements in Combined Spring-Measurers and Track-Indicators, of which the following is a specification.

This invention relates to an apparatus which we designate a "combined springometer and track-indicator," since while it is adapted to demonstrate the efficiency of car-springs by recording the various degrees of compression or flexure to which the springs are subjected during the travel of the car over any specified length of road, it is also adapted to indicate irregularities occurring in the road.

Our invention involves a threefold object: First, to provide means for automatically indicating and recording each and all of the various and varying degrees of compression or flexure to which the springs of a railway-car are subjected by reason of inequalities in the road, which, while the car is in motion, necessarily produce a jolting of the car and a consequent undue strain upon the springs. By such means a record is kept of all strains upon the springs, which record can be subsequently inspected, and hence the efficiency of the springs accurately determined. Next, to provide novel means whereby all irregularities in the road shall be automatically indicated and recorded in such manner that each and all of the various points along the road at which such irregularities occur, as well as the various degrees of such irregularities occurring in the track, shall be indicated and recorded; also, to provide a novel apparatus for a railway-car whereby, while the train is in motion, the various degrees of compression or flexure of the spring as well as all irregularities in the track shall be simultaneously indicated and permanently recorded. These objects we attain by the apparatus illustrated in the annexed drawings, in which—

Figure 1 represents a longitudinal section taken on a vertical plane through a railway-car truck with a portion of the car-body supported thereon and our apparatus in position between the bolster and spring-board of the truck, a part of the casing of our said apparatus being shown broken away. Fig. 2 is a transverse section through the same, taken on a vertical plane indicated by dotted lines 1 1. Fig. 3 represents a top or plan view of an apparatus constructed in accordance with our invention. Fig. 4 represents a longitudinal section taken on a vertical plane through Fig. 3 on the line 4 4. Fig. 5 is a side elevation of the apparatus. Fig. 6 is a detail sectional view taken longitudinally through a portion of the apparatus on a vertical plane indicated by line 6 6. Fig. 7 is a transverse section taken on a vertical plane indicated by line 7 7, Fig. 3. Fig. 8 is a side view of the receiving-roller for the record-strip, with a cap at one side of said roller removed. Fig. 9 is a detail sectional view taken transversely through a portion of the apparatus on a vertical plane indicated by line 9 9, Fig. 3.

Referring by letter to the several figures of the drawings, in which like letters denote like parts, A indicates a continuous profile or record-strip of paper or other suitable flexible material, upon which the various degrees of compressions of the springs and the irregularities in the track are to be indicated and recorded. This record-strip is designed to be drawn forward under the delineating or recording instrument during the forward movement of a car carrying the apparatus, and to such end the strip previously rolled upon one of a pair of rotary spools or rollers is unwound therefrom and fed forward to and wound upon the remaining spool or roller during the said forward movement of the car. The supply-roller B, upon which the strip is wound in the first instance, and the receiving-roller C, are both mounted at one side of a suitably-constructed frame, A', and at points intermediate of these rollers are arranged the feed and the delineating or recording devices. The feed of the strip is effected from one of the car-axles, and for this purpose we provide a feed-roll, D, driven from one of the axles through the medium of some suitable arrangement of gearing—as, for example, the axle D' of this feed-roll engages with one end portion of a longitudinally-arranged rotary shaft, E, by means of a worm-gear, F, which said shaft at its opposite end portion engages a transversely-arranged rotary shaft, G, by means of a similar worm-gear, H. This latter shaft is provided with a suitable belt-pulley, G', and is driven from one of the car-axles by appropriate gearing, or by means of a belt, chain, or cord, I, connecting said pulley with the car-axle, as in Fig. 1. The record-strip passes under and is fed forward by the feed-roll D, and is maintained in frictional contact with said roll by a spring pressure-roller, L. This pressure-roller is carried by a vibratory arm, L', which is engaged by a spring, L², of sufficient force to cause the pressure-roller to maintain the paper in frictional contact with the feed-roll. The receiving-roller C, which might be driven from the axle of the feed-roll through some arrangement of intermediate gearing, is caused to turn by means of a roller, M, arranged to press upon the strip wound on the receiving-roller. This pressure-roller M is held in frictional contact with and driven by the feed-roller, and serves to transmit motion from the latter to the receiving-roller. It is arranged to bear upon the strip wound on the latter with a yielding pressure, and hence yields to the gradually-increasing diameter of the roll of record-strip which is being wound on the receiving-roller. This roller M, while serving to turn the receiving-roller, also causes the strip to be wound closely thereon. This said combined pressure and motion transmitting roller M is carried by an arm, M', pivoted to the frame of the apparatus and engaged by one end of spring L², which is secured at its middle to a stud, M², on the frame, and serves to maintain the roller in contact with the perimeter of the feed-roller, and such roll of record-strip as may be wound upon the receiving-roller.

At the point where the indications of the spring actions and track irregularities are to be traced upon the record-strip during the forward feed of the latter the said strip passes over a guide-roller, N, arranged between the supply and the feed roller, and preferably located at a point above a direct line of feed from one to the other, whereby the moving strip shall be kept sufficiently taut while the tracings are being executed thereon.

The tracing or recording appliances embrace a stylus or pencil, N', carried at the outer end of a horizontal slide, O, which is caused to reciprocate simultaneously and in unison with the jolting of the car.

The preferred construction of pencil or tracing-instrument is that of a marking-point or pencil-lead arranged to slide in a suitable shell and caused to bear upon the record-strip by means of a spring-pressure exerted against the marking-point. In this instance the shell is secured to the slide or pencil carrier, and the spring provided for the marking-point is confined in the upper end portion of the shell. This horizontal reciprocating slide is arranged to work at right angles to the length of the record-strip, and is actuated from the body of the car through the medium of a vertically-sliding and spring-seated or spring-supported push-rod, P, which is held up at its top end against the truck-bolster or some portion of the car-body, and which, when depressed by reason of any jolt of the car or raised by its spring-support, serves to operate a mechanism by which each impulse is transmitted and imparted to the slide carrying the pencil.

The said mechanism, which we have illustrated for operating the sliding pencil-carrier from the spring push-rod, consists of a vertically-sliding rack-bar, P', connected with the spring-support for the push-rod, and engaging a pinion, Q, upon a short axle, Q', mounted in a frame of the apparatus, and carrying a second pinion, Q², which engages with a rack, O', on the under side of the sliding pencil-carrier.

As an efficient means for operating the vertically-sliding rack-bar P', which is arranged to work in a suitable guideway in or on the frame of the apparatus, said rack is connected with the upper end of the push-rod spring in some suitable manner—as, for example, by means of a lateral pin or connection, P², secured to the rack-bar and to a small cap or follower, S, secured to the upper end of the spring P³, and working within a chamber, T, in which the said spring is arranged. The pin or other connection between this follower and the rack-bar passes through and works along a vertical slot, T', formed through the wall of the case T² for the spring, and the spring can at its lower end simply rest upon the bottom of a case, U, by which the apparatus is inclosed, as in Figs. 1 and 2. This case inclosing the apparatus is preferably secured in one of the truck-frames of the car, as illustrated in Figs. 1 and 2, in such position that the top end of the push-rod will be held up and maintained by its spring-support against some portion of the car-body or truck connected therewith—as, for instance, the case is secured on the spring-board W³ of a truck, X, while the push-rod is held up against the bolster W', which is in turn held up by the car-springs W², and supporting the car-body. Under these conditions it will be seen that at and during a jolting motion of the car, and the consequent compression or flexure of the car-springs, the space normally existing between the bolster supporting the car-body and the spring-board of the truck, on which latter the apparatus is secured, will be lessened, and hence that as the push-rod between the car-body and the truck is forced against its supporting-spring P³ the latter will be compressed, and thereby, through the medium of the rack-bars and pinions, cause the pencil-carrier to move outwardly in a direction at right angles to the length of the record-strip, which will thereby cause the pencil to move over and trace upon the paper an exact indication of the extent to which the springs have been compressed or bent.

As the excess of pressure upon the springs is removed, the push-rod spring will be allowed to expand, so as to force the push-rod upwardly, and also raise the vertical rack P', whereby the pencil-carrier and pencil will be moved back to an extent corresponding to the extent to which the springs are relieved from an excess of pressure.

The irregularities in the track, as well as the various degrees to which the springs are compressed, will be indicated by an irregular line upon the moving record-strip, the line thereon being of course straight when the car is running smoothly, and correspondingly irregular when the car is running over rough portions of the road.

The weight on the springs in excess of the weight of the car-body thereon is also indicated by the position of the line traced by the pencil on the record-strip, and in order to accurately determine any such excess of weight, so as to show the load sustained by the springs and their action under such weight while the train is running over an uneven road, the paper is ruled or otherwise provided with parallel lines, as in Fig. 3, whereby the degrees of compression or flexure of the springs and the extent of the depressions or rises in the road can be accurately judged by an inspection of the record-strip.

Assuming the apparatus to be so timed that for each mile traversed by the car one yard of the record-strip passes under the pencil, it will evidently be an easy matter to determine the points where irregularities occur in the road.

Again, assuming the lines on the paper to be one-eighth of an inch apart, and a depression of one inch of the push-rod to cause one-half inch forward movement on the part of the sliding pencil-carrier, it will be seen that a line traced by the pencil from one to the next succeeding longitudinal line on the record-strip, and thereby deviating from a right line parallel to the length of the strip, will indicate a compression of the car-springs to the extent of one-fourth of an inch.

A convenient arrangement of the driving portion of the apparatus will be to arrange it so that one hundred revolutions of the belt-wheel G' shall cause one revolution on the part of the feed-roller, and also so that the said belt-wheel shall perform about six hundred and fifty revolutions to the mile. This timing of the apparatus can, however, be varied as may be preferred.

As a further means for keeping the record-strip wound tightly upon the delivery and receiving rollers, we provide springs V, one for each roller, said springs being attached to the frame of the apparatus and arranged to bear at their free ends upon the rolls of record-strip on said rollers.

The record-strip can be conveniently attached at its ends to these rollers, as illustrated in Fig. 8, in which the delivery-roller is shown consisting of a hollow cylindrical body, C', on which the strip is wound. This cylindrical body will be provided with an annular flange, $C^2$, at each end, one of which said flanges can be formed on the body or permanently secured thereon, while the remaining flange can be formed around a cap adapted to fit on one end of the cylindrical body, so that access can be had to the interior thereof for the purpose of allowing an end of the record-strip to be secured therein.

The device for fastening the strip can consist simply of a wooden pin, $C^3$, fitted in a socket in one end of the hollow body C' of the roller in position to wedge against an end of the strip entering the roller through a slot, $C^4$. Any other suitable means, however, can be provided for connecting the ends of the strip with the rollers. To prevent the operation of the feed-roll during any backing of the car, some suitable clutch is provided for causing the band-wheel G' to engage with the axle G while the train is moving forward, and to allow the wheel to run loose on said axle while the car is being backed.

A simple construction of clutch is shown in Fig. 9, in which the wheel G' is loosely arranged upon the axle G between a pair of hubs, $G^5$ and $G^6$, bolted or otherwise rigidly secured upon the axle. The wheel carries a spring-controlled pawl or pin, $G^2$, arranged within a mortise formed through the wheel in a line coincident with the axle, said pin being backed at one end by a spring, $G^3$, and at its opposite end arranged to engage in a socket, $G^4$, formed in the inner end of hub $G^6$ when the pin is brought into alignment with said socket. This end of the pin is beveled, so that when the wheel is revolved forward during the forward movement of the car the pin shall engage and lock in said socket, and when the car is backed and the wheel revolved in a reverse direction the bevel on the pin striking the wall of the socket will cause the pin to be pushed out of engagement with the socket, and hence allow the wheel to run loose on the axle.

It will be evident, however, that a variety of other constructions of clutches could be employed for the same purpose.

In Figs. 1 and 2 we have illustrated the practical application of our apparatus to a railway-car. In these figures, W denotes the car-body, and X an ordinary truck, made substantially after the construction of what is known as the "diamond truck."

The car-body is supported and turns upon what is known as the "bolster" W', which is upheld by springs $W^2$, arranged between the bolster and the "spring-board" $W^3$.

The case U, containing our apparatus, is secured upon the spring-board, and the upper end of the push-rod is maintained in contact with the under side of the bolster by the spring upon which the said push-rod is seated. From this arrangement it will be seen that as the car-wheels run over any irregular portion of the track the car springs will be successively compressed and allowed to expand, thereby operating the push-rod so as to in turn operate the reciprocating pencil-carrier.

It will be seen that this apparatus could be otherwise arranged and located at different points so long as it is intermediate of some part moving up and down with the car-body, and a part between this and the axles for the car-wheels.

Having described our invention, what we claim, and desire to secure by Letters Patent, is—

1. The car-truck, the springs thereof, and the car-body, in combination with a springometer wholly mounted on said truck and provided with a projecting push-rod engaged and actuated by the car-body when jolted, substantially as described.

2. The rigid portion of a car-truck, the springs intermediate the fixed and rigid portions thereof, and a springometer wholly mounted on said portion, in combination with a push-rod engaging with the movable portion of said truck or the car-body, whereby the mechanism of the springometer for indicating the flexure of the springs is actuated, substantially as described.

3. The car-truck, the springs thereof, and the car-body, in combination with a springometer wholly mounted on said truck and provided with a push-rod engaged and actuated by the car-body when jolted, and a belt-connection between the springometer and the truck-axle, substantially as and for the purpose described.

4. A movable carriage, a rack-bar thereon, and a pencil supported by said carriage, in combination with a push-rod, a rack-bar rigidly connected therewith, and a pinion engaging the carriage rack-bar, and in turn actuated by the push-rod rack-bar when the push-rod is depressed from its normal position, substantially as described.

5. The supply and receiving rollers and the record-strip wound thereon, in combination with a feed-roller having a connection with the receiving-roller independent of the record-strip and guide-roller between said feed-roller and supply-roller, and a pencil, between which and the guide-roller the record-strip travels, substantially as described.

6. The supply and receiving roller and the record-strip wound thereon, in combination with a feed-roller under and against which the strip travels, a pressure-roller connecting the receiving and feed rollers, and a tension-spring simultaneously actuating the feed and pressure rollers, whereby said latter rollers are maintained in uniform frictional contact, the strip pressed upon the receiving-roller and maintained under tension as it passes thereto from the supply-roller, substantially as described.

7. The supply and receiving rollers, the record-strip wound thereon, and the feed-roller connected with the receiving-roller, in combination with a belt-wheel, an intermediate shaft, and a worm-gear connecting said shaft, feed-roller, and belt-wheel, substantially as described.

8. The supply and receiving rollers, the record-strip wound thereon, the guide-roller, and means for actuating the supply and receiving roller and maintaining the record-strip under tension, in combination with a pencil, a movable carriage therefor, a rack-bar on said carriage, a push-rod and a rack-bar therefor, and a pinion engaging said rack-bar, substantially as and for the purpose described.

GEORGE W. MORRIS.
WILLIAM FRECH.

Witnesses:
W. W. ELLIOTT,
CHAS. G. PAGE.